Jan. 12, 1937. J. BELL 2,067,819
ELECTROMOTOR COMPRESSOR
Filed March 13, 1936 2 Sheets-Sheet 1

INVENTOR.
JOSEPH BELL.
BY
*H.C. Karel.*
ATTORNEY.

Jan. 12, 1937.  J. BELL  2,067,819
ELECTROMOTOR COMPRESSOR
Filed March 13, 1936  2 Sheets-Sheet 2
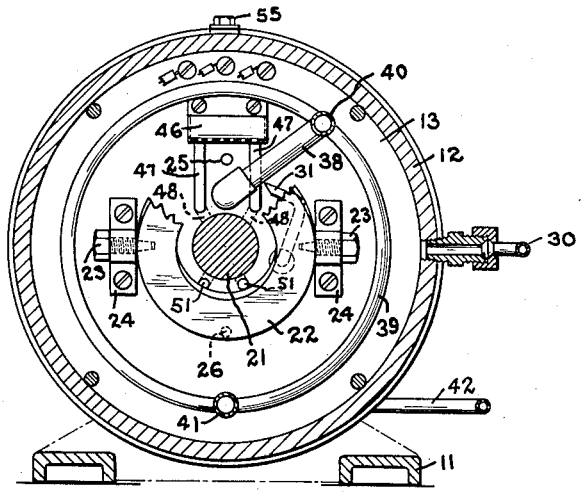
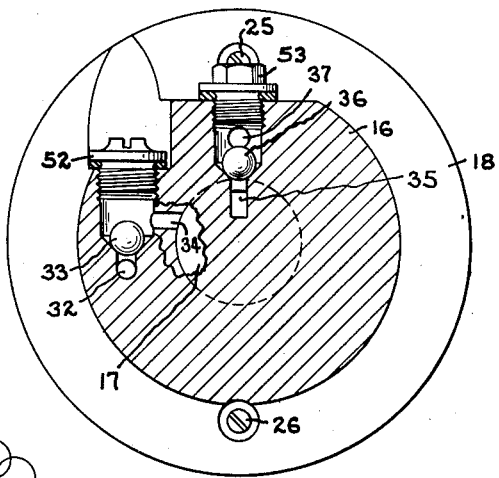
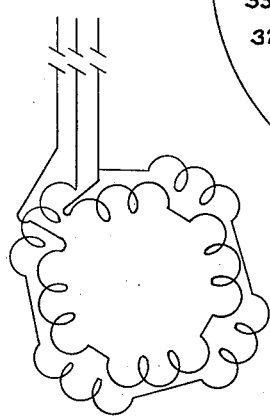
INVENTOR.
JOSEPH BELL.
BY
*H.C. Kavel.*
ATTORNEY.

Patented Jan. 12, 1937

2,067,819

UNITED STATES PATENT OFFICE 2,067,819

ELECTROMOTOR COMPRESSOR

Joseph Bell, Cincinnati, Ohio

Application March 13, 1936, Serial No. 68,724

19 Claims. (Cl. 230—55)

My invention relates to an improved electromotor combining a reciprocating motion with the rotating motion of a rotor, with the bearings for the rotor shaft forming cylinders wherein the shaft actuates for compressing fluids for use in refrigerators, temperature control, air conditioning, or may be used as a vacuum pump.

It is the primary object of my invention to provide an electromotor with a rotor which reciprocates during its rotative action. A further object is to provide a compact compressor and motor in one unit. A further object is to provide suitable bearings for said rotor for forming compression cylinders at each end of the rotor shaft. A further object is to provide adjustable means for varying the reciprocating action of the rotor. A further object is to provide condensing coils within the motor, having suitable connections with the cylinders and the exhaust passages. A further object is to provide the rotor with a divided armature to permit the reciprocation of the rotor without being retarded by the magnetic flux when passing the center line of the stator magnet core.

My invention will be further readily understood from the following description and claims, and from the drawings, in which latter Fig. 1 is a plan view of my improved motor.

Fig. 3 is a cross-section of the same, taken on the line 3—3 of Fig. 2.

Fig. 4 is an enlarged detail section, taken on the line 4—4 of Fig. 1, and

Fig. 5 is a wiring diagram of the stator.

Figure 1:
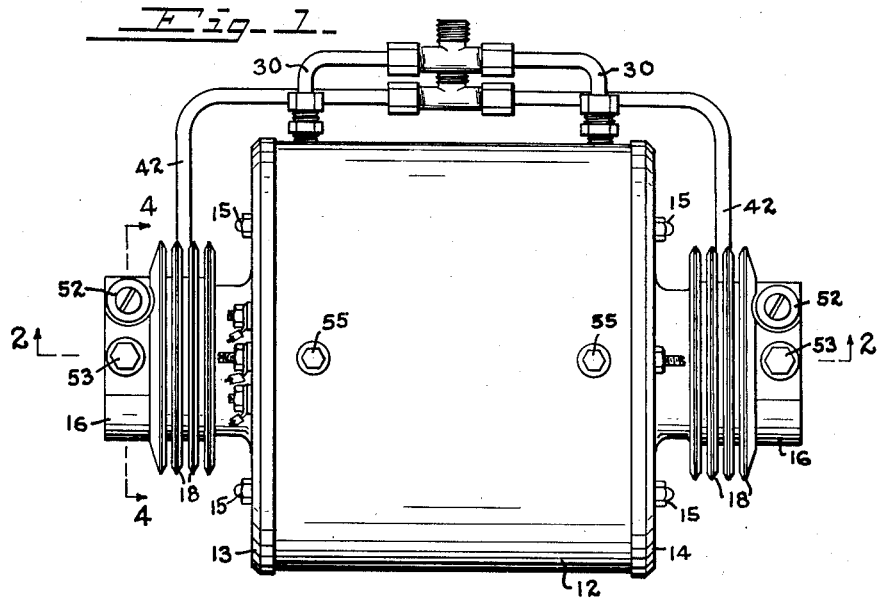
Figure 2:
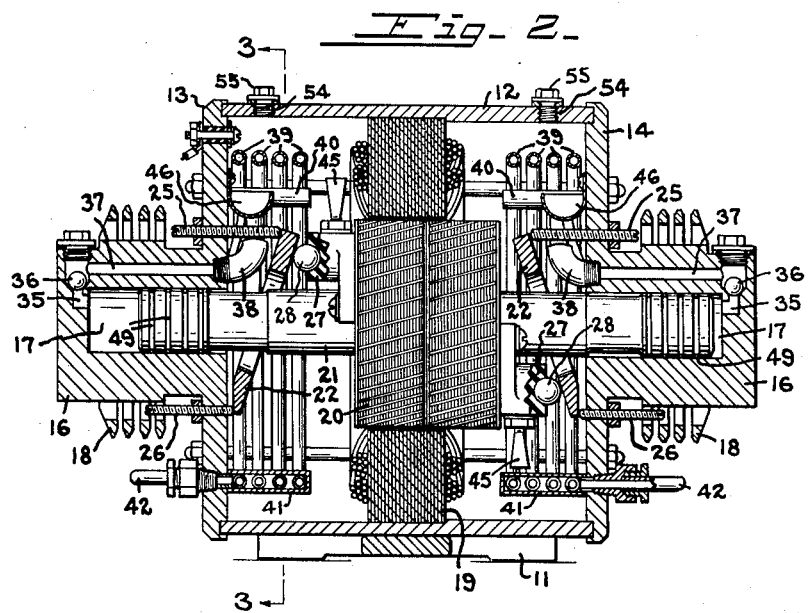
Fig. 2 is a vertical cross-section of the same, taken in the plane of the line 2—2 of Fig. 1.

My improved motor comprises a base 11, supporting a housing 12, to which end plates 13 and 14 are suitably sealed and bolted as by bolts 15. The end plates 13 and 14 are provided with extending hubs 16, forming cylinders 17 and having cooling fins 18 extending about their outer periphery. A stator core 19 is suitably clamped within the housing 12. A divided armature 20 is mounted on a shaft 21, with the extending ends of the shaft rotatable in the cylinders 17. The divided armature 20 is preferably made in two parts, whereby upon movement of the armature in an endwise direction the lines of magnetic force which tends to hold the rotor in the center line of the stator core are neutralized to prevent a drag on the armature at the time of reciprocation.

Discs 22 having a plane surface are pivoted to each of the plates 13 and 14, as by pivot bolts 23, mounted in brackets 24 and are angularly adjusted by means of screws 25 and 26.

Mounted on the armature 20 and spaced 180° apart are a pair of bearing lugs 27 of suitable insulating material and forming sockets for the thrust balls 28 which ride on the inner faces of the discs 22. Thus when current is transmitted to the stator the rotor will rotate and due to the balls 28 riding against the discs 22 the motor shaft will reciprocate back and forth in the cylinders 17. The length of this reciprocating stroke can be varied by changing the relative inclined plane of the discs 22, through adjustment of the screws 25 and 26. It may be stated that all the wiring within the motor is thoroughly coated with a waterproof and oilproof material to prevent the oil within the motor to cause grounded circuits therein.

Assuming the motor is to be used as a compressor suitable inlet connections 30 are provided for permitting incoming gas to flow into the motor housing. Upon each suction stroke of the pistons this gas will be drawn into a pipe 31 on each side of the rotor, through a port 32 past a check valve 33, a port 34, into the cylinder 17. This occurs on the suction stroke of the respective pistons which are formed by the opposite ends of the rotor shaft. As the piston moves on a compression stroke the check valve 33 is closed and the gas is forced through a port 35 past a check valve 36, through a port 37, through pipe 38 to the cooling coils 39, which are interconnected by a tube 40. From the coils 39 the gases pass to a tube 41, thence to the discharge pipes 42.

Suitable lubrication is provided for the pistons by having the lower portion of the housing carrying a suitable supply of lubricating oil which is picked up by paddles 45 secured to the lugs 27, which oil is caught in drip pans 46 and feeds to the cylinder bearings through tubes 47 connecting to ports 48 in the cylinder walls. The periphery of the shaft which moves in the bearings is provided with suitable oil grooves 49 for lubricating the pistons and forming a seal between the pistons and cylinder walls, the surplus oil drains from the bearing through ports 51 and drips back into the housing. The discs and the balls riding thereon are also lubricated by the oil picked up by the paddles.

Suitable closure caps 52 and 53 are provided for the check valves and oil filling ports 54 are provided with closure plugs 55.

A pair of circuits are provided in the stator winding to provide increased starting torque and a single phase winding for normal running, although any type of winding now in use for electromotors may be used.

It will be apparent from the foregoing I have devised a simple compressing unit with an electro motor which is suitable for use in connection with various refrigerating mechanisms or other devices wherein a compressor is useful or the device may be used as a vacuum pump.

Having thus fully described my invention, what I claim as new and desire to secure by Letters Patent, is:

1. An electromotor comprising a stator, a rotor, a shaft for said rotor, bearings for said shaft acting as compression cylinders, said shaft ends forming pistons and inclined discs having a plane surface coacting with said rotor at the respective ends thereof for reciprocating said shaft.

2. An electromotor comprising a housing, a stator, a divided armature, a shaft for said armature, bearings for said shaft acting as compression cylinders, said shaft ends forming pistons and inclined discs coacting with said armature at each end thereof for reciprocating said shaft.

3. An electromotor comprising a housing, a stator in said housing, bearings in said housing forming cylinders, a shaft journaled in said bearings, an armature fixed on said shaft, inclined discs about said shaft and secured to said housing at the respective ends of said armature, and means on said armature coacting with said discs for reciprocating said shaft in said bearings.

4. An electromotor comprising a housing, a stator in said housing, bearings in said housing forming cylinders, a rotor shaft journaled in said bearings, an armature fixed on said shaft, the ends of said shaft forming pistons in said cylinders and inclined discs and means contacting said discs between said housing and armature for reciprocating said shaft during rotation of said armature.

5. An electromotor comprising a housing, a stator in said housing, bearings in said housing forming cylinders, a rotor shaft journaled in said bearings, an armature fixed on said shaft, the ends of said shaft forming pistons in said cylinders, inclined discs about said shaft coacting with said armature for reciprocating said shaft during rotation of said armature and means for varying the angle of inclination of said discs to decrease or increase the reciprocating movement of said shaft.

6. An electromotor comprising a housing, a stator in said housing, bearings in said housing forming cylinders, a rotor shaft journaled in said bearings, an armature fixed on said shaft, the ends of said shaft forming pistons in said cylinders, inclined discs on said housing having opposite inclinations, oppositely disposed means on each end of said armature contacting said discs for reciprocating said shaft during rotation of said armature, means for varying the reciprocating movement of said shaft and means for lubricating said shaft.

7. An electromotor comprising a housing, a stator in said housing, bearings in said housing forming cylinders, a rotor shaft journaled in said bearings, an armature fixed on said shaft, the ends of said shaft forming pistons in said cylinders, inclined discs on said housing having opposite inclinations, oppositely disposed means on each end of said armature contacting said discs for reciprocating said shaft during rotation of said armature, inlet and outlet ports in said cylinders and check valves in said ports.

8. An electromotor comprising a housing, a stator in said housing, bearings in said housing forming cylinders, a rotor shaft journaled in said bearings, an armature on said shaft, the ends of said shaft forming pistons in said cylinders, means for reciprocating said shaft during rotation of said armature, inlet and outlet ports in said cylinders, check valves in said ports, and coils within said motor connected to said outlet port.

9. An electromotor comprising a housing, a stator in said housing, bearings in said housing forming cylinders, a rotor shaft journaled in said bearings, an armature on said shaft, the ends of said shaft forming pistons in said cylinders, means for reciprocating said shaft during rotation of said armature, inlet and outlet ports in said cylinders, check valves in said ports, and coils within said motor connected to said outlet port and cooling fins about the outer periphery of said bearings.

10. An electromotor comprising a housing, bearings in said housing, a rotor shaft journaled in said bearings, the respective bearings and shaft ends forming cylinders and pistons, an armature fixed on said shaft, a stator in said housing, discs set on an inclined plane, contacts coacting with said discs dependent on the rotation of said armature for reciprocating said shaft and said discs being adjustable to vary the stroke of said pistons in said cylinders.

11. An electromotor comprising a housing, bearings in said housing, a rotor shaft journaled in said bearings, the respective bearings and shaft ends forming cylinders and pistons, an armature fixed on said shaft, a stator in said housing, discs having a plane surface pivoted in said housing about said shaft and means on said armature coacting with said discs for causing said shaft to reciprocate.

12. An electromotor comprising a housing, a stator in said housing, bearings in said housing, a rotor shaft journaled in said bearings, an armature fixed on said shaft, said bearings forming cylinders, the ends of said shaft forming pistons, a fluid connection to said housing, inlet and outlet ports in said cylinders, check valves in said ports and inclined discs on said housing coacting with oppositely disposed means on said armature being dependent on the rotation of said armature for imparting a reciprocating action to said shaft.

13. An electromotor comprising a housing, a stator in said housing, bearings in said housing, a rotor shaft journaled in said bearings, an armature fixed on said shaft, said bearings forming cylinders, the ends of said shaft forming pistons, a fluid connection to said housing, inlet and outlet ports in said cylinders, check valves in said ports, discs having a plane surface mounted on said housing coacting with said armature for imparting a reciprocating action to said shaft and means for adjusting the angles of inclination of said discs for controlling the reciprocation of said shaft.

14. An electromotor comprising a housing, a stator in said housing, bearings in said housing, a rotor shaft journaled in said bearings, an armature on said shaft, said bearings forming cylinders, the ends of said shaft forming pistons, means for reciprocating said shaft, a fluid connection to said housing, inlet and outlet ports in said cylinder, check valves in said ports, coils within said motor housing connected to said outlet ports and tubular connections from said coils extending through said housing.

15. An electromotor comprising a housing, a stator in said housing, bearings in said housing, a rotor shaft journaled in said bearings, an armature on said shaft, said bearings forming cylinders, the ends of said shaft forming pistons, a fluid connection to said housing, inlet and outlet ports in said cylinders, check valves in said ports, coils within said motor housing connected to said outlet ports and tubular connections from said coils extending through said housing, means dependent on the rotation of said armature for imparting a reciprocating action to said shaft and means for controlling the reciprocation of said shaft.

16. An electromotor comprising a housing, a stator in said housing, bearings in said housing, a rotor shaft journaled in said bearings, an armature on said shaft, said bearings forming cylinders, the ends of said shaft forming pistons, a fluid connection to said housing, inlet and outlet ports in said cylinders, check valves in said ports, coils within said motor housing connected to said outlet ports and tubular connections from said coils extending through said housing, means dependent on the rotation of said armature for imparting a reciprocating action to said shaft, means for controlling the reciprocation of said shaft and means for lubricating said pistons.

17. An electromotor comprising a housing, a stator in said housing, bearings in said housing, a rotor shaft journaled in said bearings, a divided armature fixed on said shaft, said bearings forming cylinders, the ends of said shaft forming pistons, a fluid connection to said housing, inlet and outlet ports in said cylinders, check valves in said ports and inclined discs pivoted to said housing coacting with said armature for imparting a reciprocating action to said shaft.

18. An electromotor comprising a housing, a stator in said housing, bearings in said housing, cooling fins on said bearings, a rotor shaft journaled in said bearings, a divided armature fixed on said shaft, said bearings forming cylinders, the ends of said shaft forming pistons, a fluid connection to said housing, inlet and outlet ports in said cylinders, check valves in said ports and inclined discs pivoted to said housing at the respective ends of said armature and coacting with said armature for imparting a reciprocating action to said shaft.

19. An electromotor comprising a housing, a stator in said housing, bearings in said housing, cooling fins on said bearings, a rotor shaft journaled in said bearings, a divided armature on said shaft, said bearings forming cylinders, the ends of said shaft forming pistons, a fluid connection to said housing, inlet and outlet ports in said cylinders, check valves in said ports, coils within said motor housing connected to said outlet ports and tubular connections from said coils extending through said housing, means dependent on the rotation of said armature for imparting a reciprocating action to said shaft, means for controlling the reciprocation of said shaft and means for lubricating said pistons.

JOSEPH BELL.